(12) United States Patent
Matsuzawa

(10) Patent No.: US 8,180,355 B2
(45) Date of Patent: May 15, 2012

(54) BASE STATION DEVICE AND CELL FORMING METHOD

(75) Inventor: Hiromu Matsuzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 12/413,007

(22) Filed: Mar. 27, 2009

(65) Prior Publication Data

US 2009/0186623 A1    Jul. 23, 2009

Related U.S. Application Data

(63) Continuation of application No. PCT/JP2006/319478, filed on Sep. 29, 2006.

(51) Int. Cl.
*H04W 40/00* (2009.01)

(52) U.S. Cl. ...... 455/447; 455/450; 455/561; 455/562.1

(58) Field of Classification Search .................. 455/447, 455/562.2, 13.3, 13.4, 25, 52, 63.4, 193.1, 455/444, 446, 450, 456.5, 509, 522, 524, 455/525, 560, 561, 562.1, 575.7
See application file for complete search history.

(56) References Cited

U.S. PATENT DOCUMENTS

| | | | | |
|---|---|---|---|---|
| 5,844,894 A | * | 12/1998 | Dent | 370/330 |
| 5,881,094 A | * | 3/1999 | Schilling | 375/133 |
| 5,946,621 A | * | 8/1999 | Chheda et al. | 455/440 |
| 6,351,654 B1 | | 2/2002 | Huang et al. | |
| 6,654,612 B1 | * | 11/2003 | Avidor et al. | 455/450 |
| 6,721,569 B1 | | 4/2004 | Hashem et al. | |
| 6,734,823 B2 | * | 5/2004 | Mintz et al. | 342/463 |
| 7,003,302 B2 | * | 2/2006 | Yoshida et al. | 455/450 |
| 2001/0024430 A1 | * | 9/2001 | Sekine et al. | 370/331 |
| 2002/0077152 A1 | * | 6/2002 | Johnson et al. | 455/562 |
| 2004/0053626 A1 | | 3/2004 | Yagi | |
| 2004/0125743 A1 | | 7/2004 | Hashem et al. | |
| 2005/0233752 A1 | | 10/2005 | Laroia et al. | |
| 2005/0250502 A1 | | 11/2005 | Laroia et al. | |
| 2006/0126493 A1 | | 6/2006 | Hashem et al. | |

(Continued)

FOREIGN PATENT DOCUMENTS

EP    1043861    10/2000

(Continued)

OTHER PUBLICATIONS

International Search Report dated Jan. 16, 2007.

(Continued)

*Primary Examiner* — Cong Tran
(74) *Attorney, Agent, or Firm* — Murphy & King, P.C.

(57) ABSTRACT

A base station device includes a plurality of directional antennas, a power control unit and a frequency management unit. The cell is formed with layers of a base cell having a cell border with a cell formed by a neighboring base station device and including a plurality of sector cells and a small-cell having a cell radius smaller than a cell radius of the base cell and including at least four sector cells by the plurality of directional antennas and the power control unit. The frequency management unit manages frequency bands so that different frequency bands are allocated to the sector cells of the base cell, and a frequency band, which is different from the frequency bands allocated to the base cell and different between neighboring sector cells but the same between at least two sector cells, is allocated to each of the sector cells of the small-cell.

8 Claims, 12 Drawing Sheets

U.S. PATENT DOCUMENTS

2006/0246917 A1 * 11/2006 Jin et al. .................. 455/450
2008/0167077 A1    7/2008 Raffaelli et al.

FOREIGN PATENT DOCUMENTS

| | | |
|---|---|---|
| JP | 03244224 | 10/1991 |
| JP | 11127105 | 5/1999 |
| JP | 11215055 | 8/1999 |
| JP | 2000286822 | 10/2000 |
| JP | 2001197551 | 7/2001 |
| JP | 2003244741 | 8/2003 |
| WO | 2005109917 A1 | 11/2005 |
| WO | 2006071154 A1 | 7/2006 |

OTHER PUBLICATIONS

WiMAX Forum . . . A Technical Overview and Performance Evaluation . . . Mobile WiMAX-Part 1 dated Feb. 16, 2006.

Notice of Reason for Rejection dated Mar. 22, 2011, with its English translation in the corresponding Japanese application No. 2008-537339.

\* cited by examiner

BASE STATION DEVICE AND CELL FORMING METHOD

CROSS-REFERENCE TO RELATED APPLICATIONS

This is a continuation of Application PCT/JP2006/319478, filed on Sep. 29, 2006, now pending, the contents of which are herein wholly incorporated by reference.

FIELD

The present invention relates to a base station device building up a cellular system actualized by use of a wireless system such as FDMA and OFDMA required to take allocation of frequencies into consideration and to a cell forming method in the cellular system.

As a cell configuration for covering a service target area without any blind area in a cellular system etc, there are a method of configuring an area by omni-cells using non-directional antennas and a method of configuring the area based on a sector configuration in which the cell is equally divided at a predetermined angle by using the directional antennas. As the sector configuration, three sector cells dividing the cell into three and six sector cells dividing the cell into six are general.

In these cell configurations, in order to ensure a communication quality while employing limited frequency resources at high efficiency, a frequency allocation (frequency reuse) method that restrains an interference level from neighboring cells and peripheral near cells down to a predetermined value or under is required. This type of frequency allocation does not, if a CDMA (Code Division Multiple Access) method is utilized, need taking into consideration because of being capable of demultiplexing based on spreading codes but requires, if an FDMA (Frequency Division Multiple Access) method and an OFDMA (Orthogonal Frequency Division Multiplexing) method are employed, that a proper frequency reuse configuration is designed so as to adequately separate channels allocated to individual users. In this case, the whole cells are grouped so that the cells, which are not distanced to such a degree as to satisfy an allowable interference level, belong to the same group, and the same frequency band is not used among the cells belonging to the same group and is repeatedly employed in the different groups, thereby scheming to effectively utilize the frequency resources.

A system operator, who operates this type of cellular system etc, divides the frequency bandwidth to be allocated by the number of cells within the same group and determines a frequency bandwidth usable in each cell. Accordingly, a decrease in dividing count with a reduction in the number of cells within the same group, i.e., a decrease in repetitive distance leads to enlargement of the frequency band usable in each base station and, by extension, enables a traffic amount accommodable within each base station to be increased, which is effective in improving the frequency-utilization efficiency.

This type of frequency allocation method is exemplified by a method of previously designing the allocation of the cells so that interference between the cells falls within an allowable value or under and fixedly allocating the frequencies and, in addition, a method using a DCA (Dynamic Channel Assignment) technology. The DCA is a technology (refer to the following Patent document 1) of selecting and adaptively assigning such frequency bands and subchannels that the interference level between the cells becomes equal to or smaller than the allowable value, corresponding to a state of utilizing the frequencies. According to the DCA technology, the interference between the cells can be prevented, and simultaneously the frequency-utilization efficiency can be increased.

In the recent years, there has been a technology called WiMAX (Worldwide Interoperability for Microwave Access) (refer to the following Non-Patent document 1) based on IEEE802.16 standard set as one standard for the wireless communication technology. The WiMAX uses the OFDMA method as a multi channel access method. In the wireless communication system using the WiMAX, the transmission frequency band is divided into a plurality of subchannels, and the control is performed so that the same subchannel is not simultaneously assigned both between the neighboring base stations and between the sectors in the same base station as by the DCA technology described above. With this scheme, the WiMAX communication system has a mechanism that prevents the interference between the cells while sharing the same frequency band with the entire cells and enhances the frequency-utilization efficiency.

For others, the following documents are given as the documents that disclose the conventional arts related to the invention of the present application.

[Patent document 1]: U.S. Pat. No. 6,721,569
[Patent document 2]: Japanese Patent Laid-Open Publication No. 2000-286822
[Patent document 3]: Japanese Patent Laid-Open Publication No. H11-215055
[Non-Patent document 1]: WiMAX Forum. "A Technical Overview and Performance Evaluation". Mobile WiMAX-Part 1. Feb. 16, 2006

SUMMARY

In the adaptive assignment method for the frequency bands and the subchannels based on the DCA technology described above, however, if the traffic quantity exceeds a predetermined quantity, such a problem arises that there is no alternative but to assign the necessary frequency bands and subchannels even when the interference level exceeds the allowable value, and there is an increase in probability that the same frequency band and the same subchannel are simultaneously used. In this case, a desired communication quality can not be maintained due to a rise in interference between the cells.

On the other hand, in the case of adopting a scheme that deals with as a call loss without assigning the frequency band and the subchannel if the interference level exceeds the allowable value in the same method, a new call can not be accepted, and it follows that a throughput of the system declines.

Further, in order to adaptively assign the channels in the same method, it is required to measure respectively a state of the interference about each call, predict the interfered state of the new call in the case of assigning an assignment-scheduled channel, and predict an interfering state of the new call with an existing call using the same channel. This scheme requires highly complicated control.

Such being the case, the Patent document 1 given above discloses, as a method for solving this problem, a method enabling the same frequency band to be allocated between the base stations in the communication system using the WiMAX. FIG. 11 is a diagram representing the frequency allocation method based on the conventional art disclosed. To be specific, according to this method, communication areas A1, A2 and A3 are separated respectively into doughnut-shaped areas in the omni configuration. Then, the same frequency band (F1+F2+F3) in all of the base stations is allocated to a user positioned in the central circular area, and subchannel groups different among the neighboring base stations are allocated to the users positioned in area other than the communication areas. Namely, a scheme of this technique is that the interference is prevented by allocating the different frequencies between the neighboring cells in the vicinity of a cell edge showing large interference, and the frequency-utilization efficiency is raised by use of the same frequency in the entire cells in the vicinity of the base station showing small interference. This technique does not especially need the DCA technology based on the measurement of the state of the interference and so on.

However, this technique, strictly speaking, intends to equalize the frequencies in use for the respective base stations to the whole allocated frequencies, which does not mean that the frequency-utilization efficiency is further improved.

Similarly, a method of setting the frequency in use for the respective base stations to the whole allocated frequencies is exemplified by a method of using the same frequency in the neighboring base stations in a way that takes a sector configuration for reducing the interference quantity with directivity by employing directional antennas. FIG. 12 illustrates an example of allocating the frequencies in the case of using the sector configuration such as this. FIG. 12 represents the example of using a 3-sector configuration, wherein an illustration extracted in a left lower part indicates a cell C1 formed by one base station BS1. According to this configuration, the cell C1 is divided into three sector cells S1, S2 and S3, and frequency bands F1, F2 and F3, which are different from each other, are allocated as usable frequency bands to the respective sector cells. Then, the predetermined frequency bands are allocated to the whole sector cells so as not to use the same frequency band between the neighboring sector cells. This scheme enables the frequencies in use for the individual base stations to be set as the whole allocated frequencies.

Also in this sector configuration, however, a mobile station existing at a sector border of the same base station can not use the same frequency band between the neighboring sector cells because a distance from the directional antenna forming the sector cell where the mobile station is located at the present is equal to a distance from the directional antenna forming the neighboring sector cell and because angle losses of the directional antennas are equal to each other. Accordingly, there is only an effect that the frequencies in use for the respective base stations can be set to the whole allocated frequencies even by taking the sector configuration such as this.

It is an object of the present invention to provide a base station device and a cell forming method that improve frequency-utilization efficiency while keeping a communication quality. Particularly, the present invention aims at setting, with respect to the frequency-utilization efficiency, the frequencies in use for the respective base stations larger than the whole allocated frequency band.

The present invention adopts the following configurations in order to solve the problems given above. Namely, the present invention is a base station device characterized in forming one cell and including: a plurality of directional antennas; a power control unit controlling respectively transmission power of signals transmitted from the directional antennas; and a frequency management unit managing frequency bands used in the cell, wherein the cell is formed with layers of a base cell having a cell border with a cell formed by a neighboring base station device and including a plurality of sector cells and a small-cell having a cell radius smaller than a cell radius of the base cell and including at least four sector cells, by the plurality of directional antennas and the power control unit, and the frequency management unit manages frequency bands so that frequency bands different from each other are allocated to the sector cells of the base cell, and a frequency band, which is different from the frequency bands allocated to the base cell and different between the neighboring sector cells but the same between at least two sector cells, is allocated to each of the sector cells of the small-cell.

In the base station device according to the present invention, the plurality of directional antennas is utilized, whereby the cell is formed, as described above, with a layers of the base cell and the small-cell each having the sector configuration. With respect to the sector cells of the base cell, the same frequency band is not used between other sector cells of which sector cell borders abut on each other within the same base cell. Moreover, with respect to the sector cells of the small-cell, also in the relationships with the sector cells of the base cell on which those put, and any other sector cells of which the cell borders abut on within the same small-cell, the same frequency band is not used.

With this contrivance, also with respect to the mobile terminal existing at any sector borders, an interference level can be restrained down to an allowable level or under, and a desired communication quality can be maintained.

Moreover, if frequency reuse allocation is conducted so that the same frequency band is not allocated among the sectors having the cell borders in the neighboring base stations, all of the base station devices can repeatedly utilize the whole allocated frequency bands. Furthermore, with respect to the sector cells of the small-cell, the same frequency band is allocated to at least the two sector cells, and hence the total frequency band utilized in one base station device can be set larger than the whole frequency band allocated to each base station device.

Therefore, according to the present invention, the frequency-utilization efficiency can be further improved without using any technique requiring the complicated processes as by the DCA technology.

Further, the frequency management unit may manage the frequency bands so that the two frequency bands are alternately allocated to the respective sector cells of the small-cell.

According to this configuration, the two frequency bands are used repeatedly the number of times into which the number of sector cells of the small-cell is divided by 2, and hence the total frequency band utilized in one base station device can be further increased.

Moreover, the frequency management unit may manage the frequency bands so that the different frequency bands are allocated to face-to-face sector cells of the small-cell in a relationship with the neighboring base station device.

According to this configuration, also in the relationship with the neighboring base station devices, the interference between the small-cells can be prevented, and therefore the desired communication quality can be kept. Further, the cell radius of the small-cell can be expanded to the maximum limit, and hence traffic accommodable within each sector cell of the small-cell can be increased.

Further, the power control unit may control the transmission power of each signal so that the cell radius of the small-cell becomes a half of the cell radius of the base cell.

According to this configuration, if the different frequency bands are allocated to the face-to-face sector cells of the small-cells of the neighboring base station devices, the interference level can be restrained down to the allowable level or under, and, in addition, the cell radius of the small-cell can be maintained broadly to some extent, thereby enabling the traffic accommodable within each sector cell of the small-cell to be increased.

Moreover, the base station device according to the present invention may further includes a notifying unit notifying each of the sector cells of the base cell and the small-cell of HCS (Hierarchical Cell Structure) control information in which the priority of the small-cell is set higher than the priority of the base cell.

With this configuration, the mobile terminal connected to the base station device according to the present invention, even in the case of performing wireless communications with the base station forming the cell having the structure in which the small-cell is put on the base cell, can utilize the proper cell corresponding to its position.

It should be noted that the frequency band allocated to each sector cells described above is a concept embracing a sub-channel group. This is according to the wireless communication system utilized by the base station device.

Moreover, the present invention can be realized by way of a cell forming method having the same characteristics as those of the base station device according to the present invention described above, a program for making an information processing device (computer) function as the base station device according to the present invention, or a recording medium recording the program.

According to the present invention, it is possible to provide the base station device and the cell forming method that improve the frequency-utilization efficiency while keeping the communication quality. Particularly, with respect to the frequency-utilization efficiency, the frequency bands in use for the respective base stations can be set larger than the whole allocation frequency bands.

DESCRIPTION OF EMBODIMENTS

[Embodiment]

An FDMA cellular system in an embodiment of the present invention will hereinafter be described with reference to the drawings. The FDMA cellular system will be discussed by way of the embodiment of the present invention, however, the present invention is not limited to a configuration of the embodiment which will be discussed later on, may be a cellular system using WiMAX, and may be a system actualized by use of a wireless system required to take allocation of frequencies into consideration.

[System Architecture]

Figure 1:
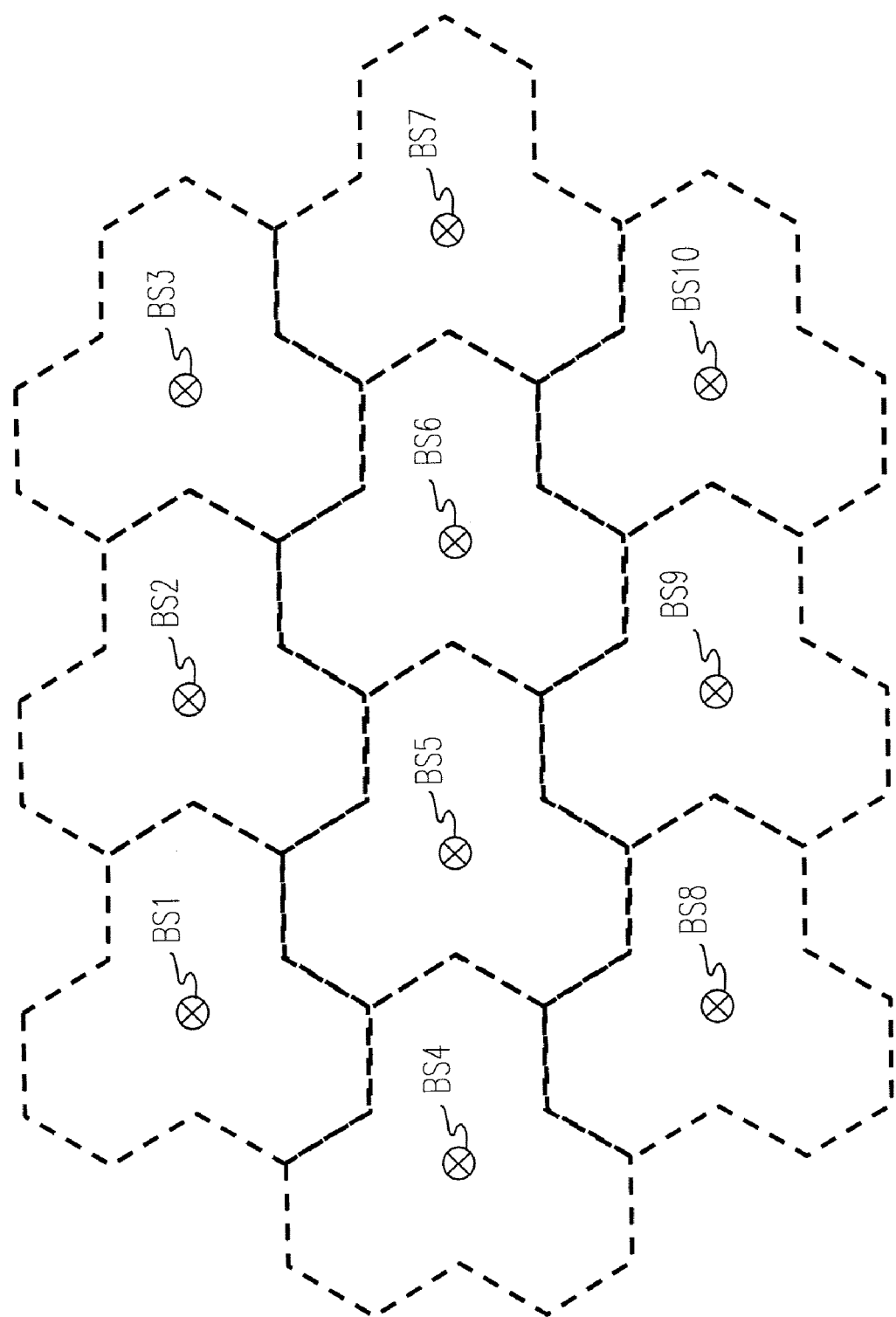
FIG. 1 is a diagram representing an example of a system architecture of an FDMA cellular system in an embodiment.

A system architecture of the FDMA cellular system in the embodiment will hereinafter be explained with reference to FIG. 1. FIG. 1 is a diagram representing an example of the system architecture of the FDMA cellular system in the embodiment.

The FDMA cellular system in the embodiment is, as illustrated in FIG. 1, configured by connecting a plurality of base stations (e.g., BS1 through BS10) located in a way that covers a service target area without any blind area via networks (unillustrated). A mobile terminal (unillustrated) such as a mobile phone is connected to the FDMA cellular system in the embodiment by performing wireless communications with the closest base station (which is any one of the base stations BS1 through BS10) and is provided with a communication service such as a call service.

Figure 2:
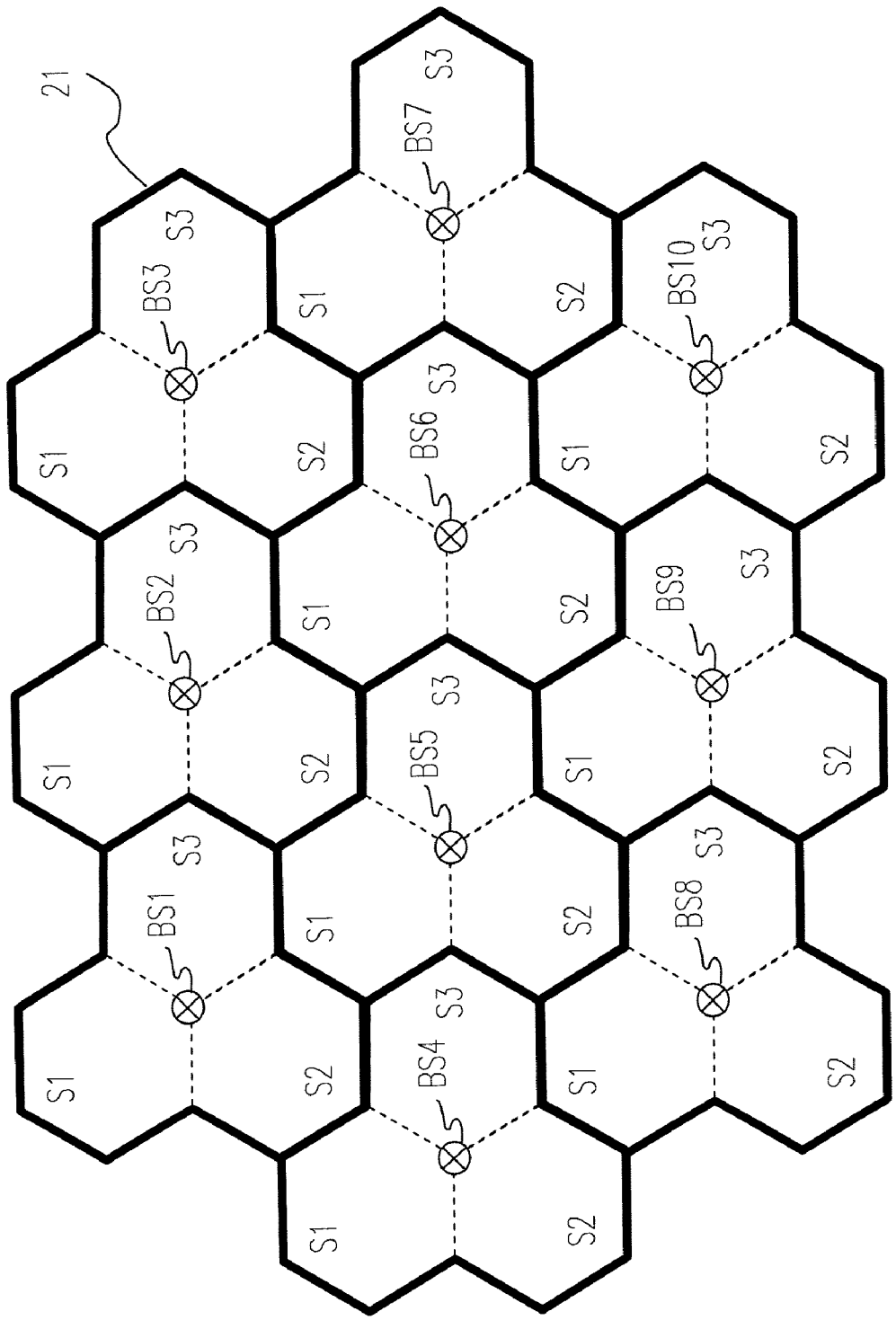
FIG. 2 is a diagram representing an example of a cell configuration of a base station in the embodiment.
Figure 3:
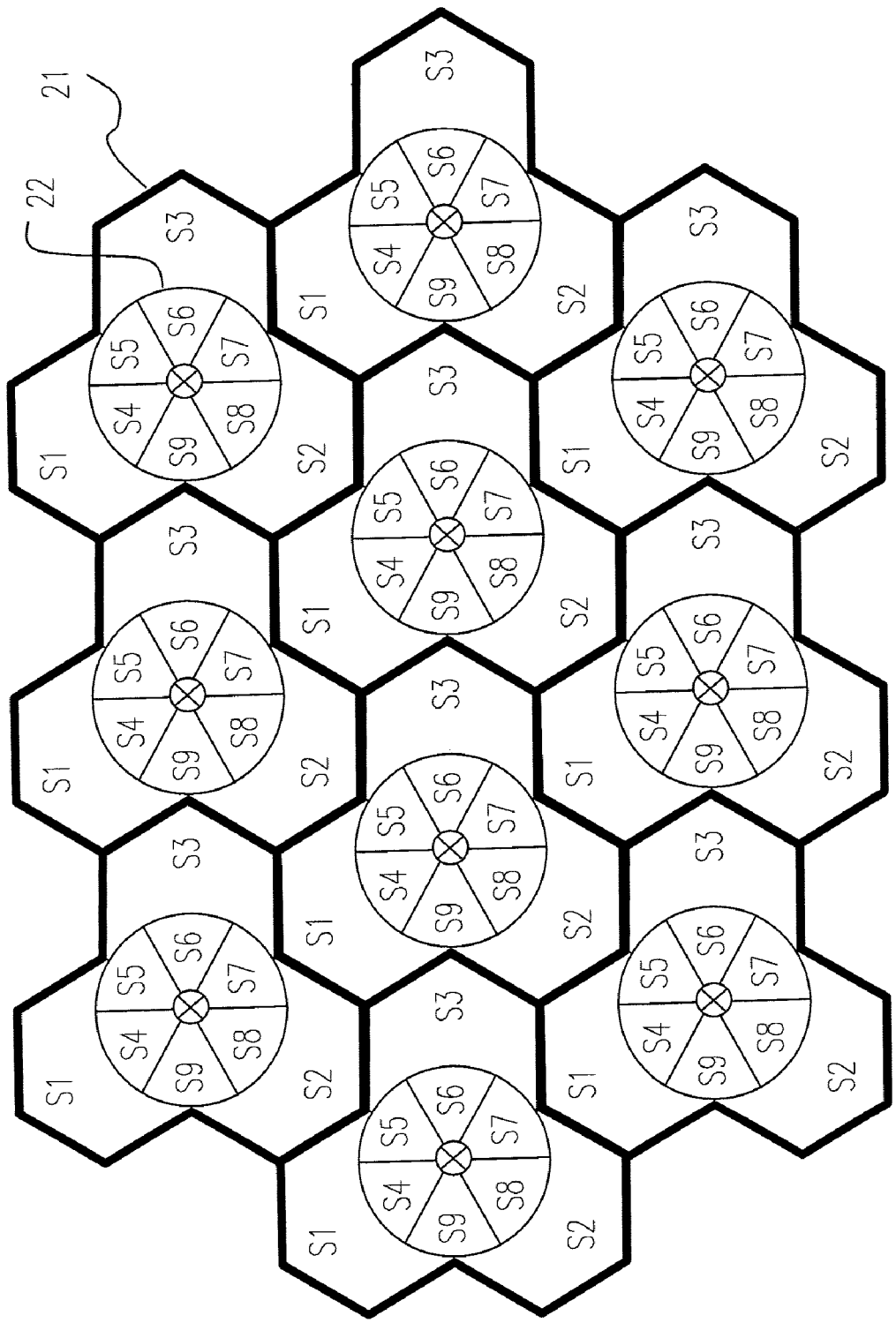
FIG. 3 is a diagram representing an example of the cell configuration of the base station in the embodiment.

Next, a sector configuration of each of cells formed by the individual base stations will be explained with reference to FIGS. 2 and 3. FIGS. 2 and 3 are diagrams each illustrating an example of the cell configuration of the base station in the embodiment.

Each of the base stations BS1 through BS10 has a directional antenna, and forms the cell having the sector configuration. Each of the base stations BS1 through BS10 has the same functional configuration with respect to functions according to the present invention, and hence, in the following discussion, the reference numerals and symbols of the respective base stations are not illustrated except when particularly necessary.

The cells of each base station adopt a 3-sector configuration (numeral 21 in FIG. 2, sector cells S1, S2 and S3 in FIG. 3) in which borders abut on the cells of the neighboring base stations, and also adopt the configuration in which a small-cell (the numeral 22 and sector cells S4, S5, S6, S7, S8 and S9 in FIG. 3) of a 6-sector configuration, which do not abut on the cells of the neighboring base stations, is overlaid on that configuration and in an internal peripheral region of the base station. Hereafter, in the cell formed by the base station, an area of the 3-sector configuration illustrated in FIG. 2 is referred to as a base cell 21, while an area of the 6-sector configuration illustrated in FIG. 3 is termed a small-cell 22.

The small-cell 22 is formed by setting downlink transmission power given from the base station smaller than transmission power forming the base cell 21. An area radius of the small-cell 22 represents a limit range capable of keeping a received level at which a predetermined communication quality is satisfactory to a user within the small-cell 22. The area radius of the small-cell 22 in the examples shown in FIGS. 2 and 3 is set to approximately a half of a radius of the base cell 21. The present invention does not limit the area radius of the small-cell 22 to the example such as this and may take a configuration so that the area radii are respectively different in the individual base stations so as to meet the target communication quality in the cells.

Note that the embodiment exemplifies the case of adopting, as illustrated in FIG. 2, the 3-sector configuration as the sector configuration in the relationship with the neighboring base stations, however, a system architecture in the case of adopting other sector configurations will be described in the section [Modified Examples].

Figure 4:
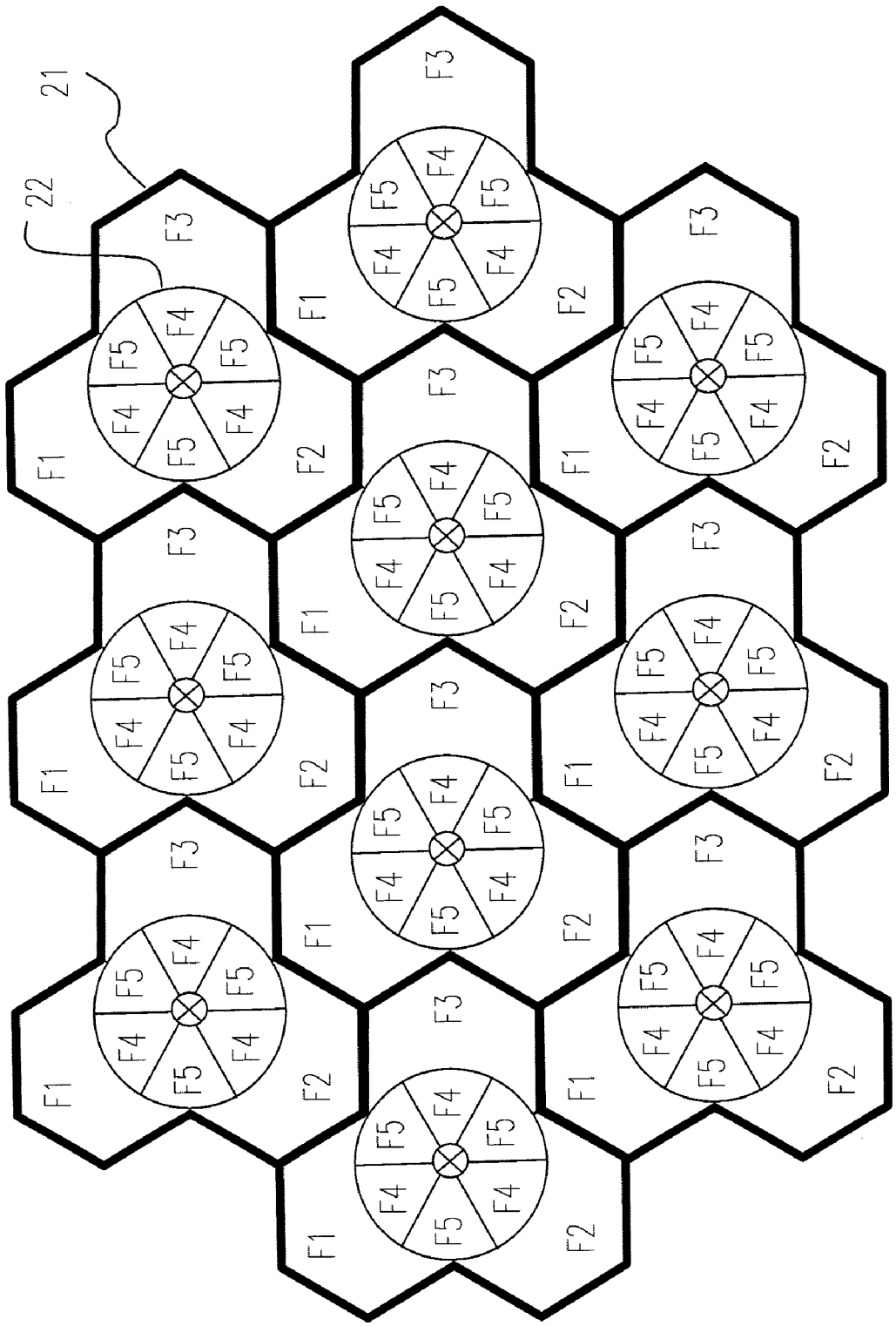
FIG. 4 is a diagram representing an example of a frequency allocation in the embodiment.

Moreover, frequency bands allocated to the base cell 21 and the small-cell 22 described above will hereinafter be described with reference to FIG. 4. FIG. 4 is a diagram of an example representing a frequency allocation in the embodiment.

The different frequency bands are allocated to the sector cells S1, S2 and S3 of the base cell 21. This scheme is derived from that each sector cell abuts at the sector border on other sector cells, and hence, a difference between the received levels becomes 0 decibel (dB) at the sector border with the result that a desired communication quality can not be acquired. Further, different frequency bands are allocated between the respective sector cells of which the cell borders abut on other neighboring base cells 21.

Frequency bands different from the frequency bands allocated to the individual sector cells of the base cell 21 are allocated to the respective sector cells S4-S9 of the small-cell 22 so that the neighboring sector cells do not share the same frequency band. Namely, the frequency band for the small-cell 22 different from the frequency bands allocated to the base cell 21 is further divided by 2, and the thus-divided frequency bands are alternately allocated to the individual sector cells of the small-cell 22.

Eventually, the frequency bands allocated to the respective sector cells are, when each denoted by [F (numerical value)], allocated as follows.

Sector cell S1: F1
Sector cell S2: F2
Sector cell S3: F3
Sector cell S4: F4
Sector cell S5: F5
Sector cell S6: F4
Sector cell S7: F5
Sector cell S8: F4
Sector cell S9: F5

Moreover, as illustrated in FIG. 4, a preferable allocation is that the sector cells in the small-cell 22, to which the same frequency bands are allocated, do not face on each other in the neighboring base stations. In this case, with respect to the small-cell 22 of the base station BS5, the sector cell S4 faces on the sector cell S7 of the base station BS1, however, the frequency bands F4 and F5 are allocated to the sector cells S4 and S7. Similarly, the sector cell S5 of the small-cell 22 of the base station BS4 faces on the sector cell S8 of the base station BS1, however, the frequency bands F4 and F5 are allocated to the sector cells S5 and S8. If the frequency allocation such as this is adopted, the area radius of the small-cell 22 can be enlarged.

The adoption of the frequency allocation such as this enables the frequency band, which can be allocated per base station, to be larger than the total frequency band usable for the whole system.

To be specific, if the frequency bandwidth usable for the whole system is F, and the frequency bandwidth F is repeatedly utilized in the respective base stations. In each base station, this frequency bandwidth F is divided for the five groups (F1, F2, F3, F4, F5 described above), and the divided frequency bands are allocated to the individual sector cells S1-S9. Accordingly, the total frequency band used in the respective base stations are given such as F1+F2+F3+F4×3+F5×3), which value is larger than the frequency bandwidth F (=F1+F2+F3+F4+F5) utilizable for the whole system.

Note that if increasing a ratio of the frequency bands (subchannel bands) F4 and F5 allocated to the small-cell 22 to the total frequency band allocated to each base station, the frequency bands used in the respective base stations can be larger than the frequency bands allocated to the whole system.

[Configuration of Device]

Figure 5:
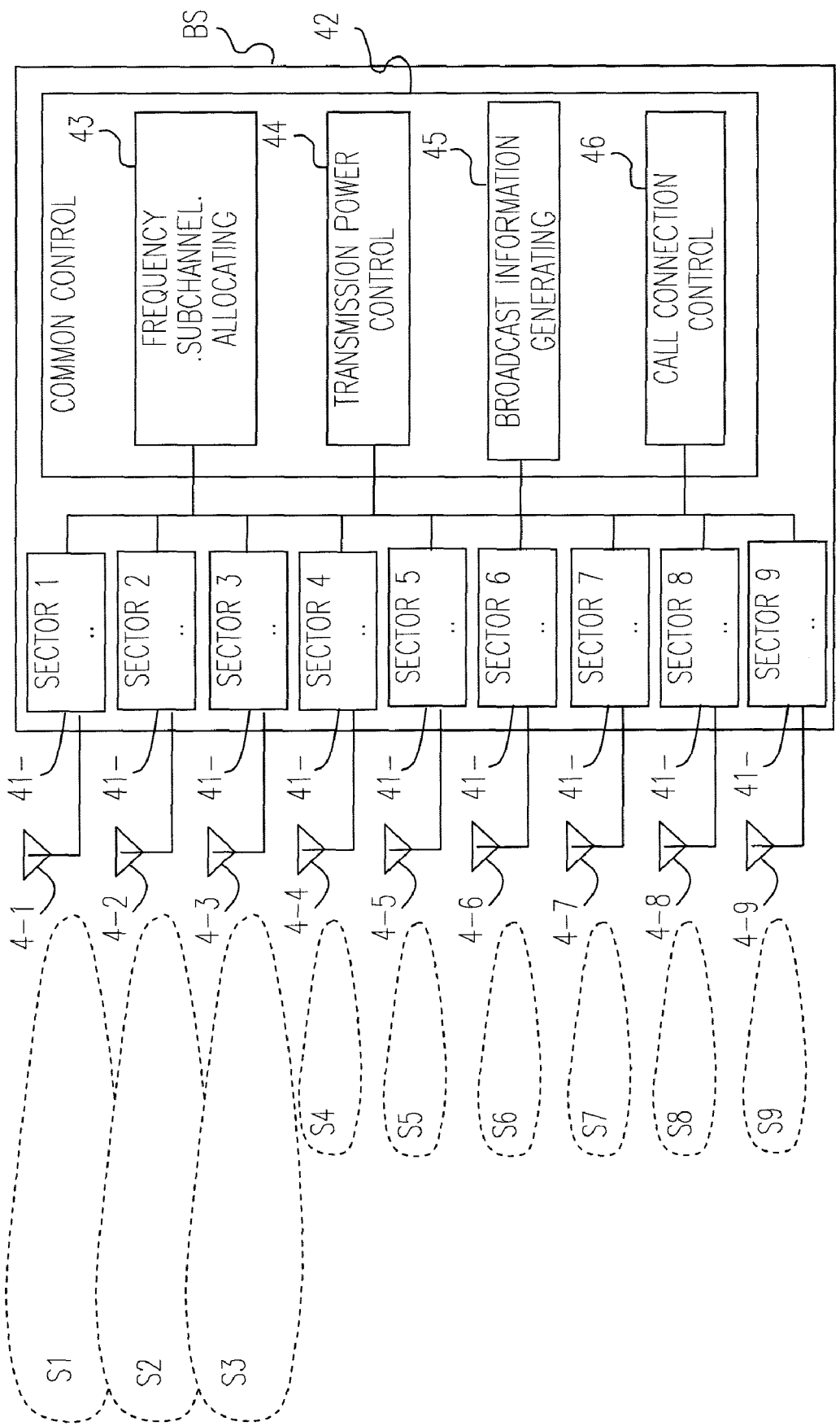
FIG. 5 is a diagram representing an outline of a functional configuration of the base station.

The functional configuration of the base stations (BS1 through BS10) of the FDMA cellular system in the embodiment will hereinafter be described. FIG. 5 is a diagram representing an outline of the functional configuration of the base station.

The base station includes antennas 4-1 through 4-9, radio units 41-1 through 41-9 and a common control unit 42, etc. The common control unit 42 further includes a frequency allocating unit 43, a transmission power control unit 44, a broadcast information generating unit 45, a call connection control unit 46, etc. The radio units 41-1 through 41-9 and the common control unit 42 may, as a hardware configuration, be realized by hardware circuits, and may also be realized in such a way that a control program stored in a memory is loaded and executed by a CPU (Central Processing Unit).

Each of the antennas 4-1 through 4-9 is a directional antenna such as a Yagi Antenna, which radiates the radio waves in a specified direction. The antennas 4-1 through 4-9 are disposed so that radio waves (signals) radiated from these antennas form the respective sector cells S1 through S9. Note that the embodiment exemplifies the case in which one sector cell is formed by one antenna, however, if the single antenna is capable of forming a plurality of sector cells owing to an antenna characteristic, a configuration such as this may also be adopted.

Each of the radio units 41-1 through 41-9 is connected to any one of the antennas 4-1 through 4-9, and processes the signal that should be transmitted from each antenna and the signal received from each antenna. Each of the radio units determines a frequency band allocated to a transmission signal for each user and a frequency band allocated to a report signal within the frequency band allocated from the frequency allocating unit 43 that will be described later on, and generates an FDMA signal into which these signals are multiplexed. Incidentally, in the case of utilizing the OFDMA as a wireless method, each radio unit receives allocation of a predetermined subchannel group from the frequency allocating unit 43, and determines each subchannel used for each user in the subchannel group.

Moreover, each radio unit supplies the transmission power sent respectively from the transmission power control unit 44, which will be explained later on, to the signal transmitted from the antenna connected thereto. The signal generated by each radio unit is transmitted from the antenna to be connected. Note that a detailed function of each radio unit is the same as the general radio signal processing function based on the wireless method adopted, and therefore an in-depth description thereof is omitted.

The frequency allocating unit 43 allocates the transmission frequency bands (subchannel groups) of the respective signals transmitted from the antennas 4-1 through 4-9 in a format illustrated in FIG. 3. To be specific, the total frequency band allocated as the frequency bands usable for the FDMA cellular system in the embodiment is divided into five frequency bands (subchannel groups) F1 through F5 in accordance with a traffic ratio among the respective sectors, and the divided frequency bands are allocated to the respective sector cells by the method described above. The frequency band allocation information such as this may be previously stored adjustably in the internal memory etc of the base station, and may also be acquired from other base station control device (unillustrated).

Figure 6:
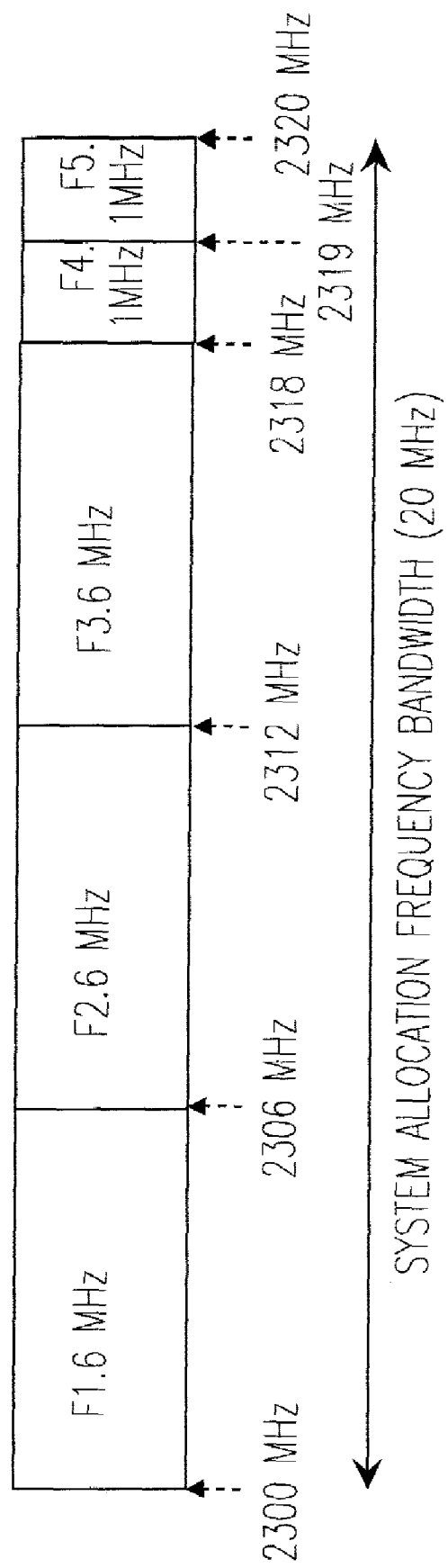
FIG. 6 is a diagram representing an example of frequency bands allocated by a frequency allocating unit 43.

FIG. 6 is a diagram representing an example of the frequency bands allocated by the frequency allocating unit 43. Supposing that 20 megahertz (MHz) is allocated as the frequency band usable for the whole FDMA cellular system in the embodiment, the example in FIG. 6 indicates the frequency bands F1 through F5 allocated to the sector cells S1 through S9 by the frequency allocating unit 43.

In this example, an assumption is that the traffic represents a fixed distribution (area ratio=traffic ratio) within a service target area, and the frequency band usable for the whole system is divided corresponding to the area ratio among the sectors. It is preferable that the frequency band dividing ratio is determined corresponding to an actual traffic amount defined as a status in the place where the respective sector cells are disposed.

Frequency band F1: 6 (MHz) given from between 2300 (MHz) and 2306 (MHz)

Frequency band F2: 6 (MHz) given from between 2306 (MHz) and 2312 (MHz)

Frequency band F3: 6 (MHz) given from between 2312 (MHz) and 2318 (MHz)

Frequency band F4: 1 (MHz) given from between 2318 (MHz) and 2319 (MHz)

Frequency band F5: 1 (MHz) given from between 2319 (MHz) and 2320 (MHz)

The transmission power control unit 44 determines the transmission power of the respective signals transmitted from the antennas 4-1 through 4-9 so as to form the sector configuration as illustrated in FIG. 3. Namely, the transmission power control unit 44 sets the transmission power of the signals transmitted from the antennas forming the small-cell 22 smaller than the transmission power of the signals transmitted from the antennas forming the base cell 21. Note that a transmission power value determined by the transmission power control unit 44 has no necessity of being dynamically determined and previously retained adjustably within the base station.

Figure 7:
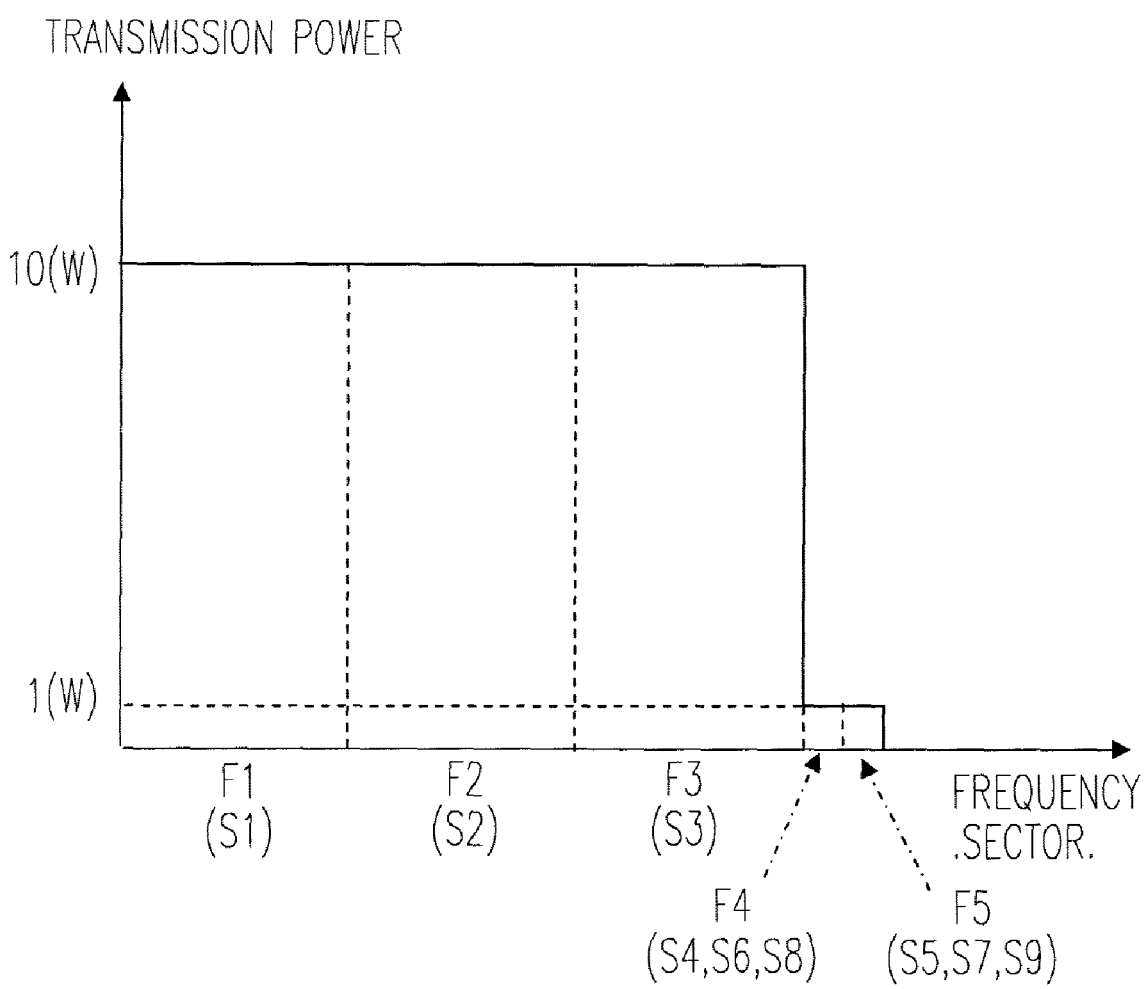
FIG. 7 is a diagram representing and example transmission power of each sector, which is determined by a transmission power control unit 44.

FIG. 7 is a diagram representing an example of the transmission power of each sector cell, which is determined by the transmission power control unit 44. The small-cell 22 is thereby formed in the internal area, peripheral to the base station, of the base cell 21 (the sector cells S1, S2 and S3). A method by which the transmission power control unit 44 determines the transmission power will be described later on.

The broadcast information generating unit 45 generates control information set by the broadcast signal transmitted from each antenna. The broadcast information contains HCS (Hierarchical Cell Structure) control information representing that the individual sector cells formed by the respective antennas are the cells needed for HCS standby control, priority information representing the priority of the sector cells, and information (the frequency band etc) on the neighboring cells. The HCS standby control is recommended in 3GPP (3rd Generation Partnership Project) TS25.304/992. The present invention utilizes the HCS standby control as it is.

Under the normal standby control, the mobile terminal senses a movement between the cells, corresponding to the received level of the control signal in the position thereof. Hence, according to the embodiment, the mobile terminal is, since the broadcast signal transmitted to each sector cell of the base cell 21 is received at a higher level of power than that of the broadcast signal transmitted to each sector cell of the small-cell 22, unable to use the respective sector cells of the small-cell 22.

Such being the case, under the HCS standby control, in the cell configuration taking the overlay structure as in the embodiment, a scheme is that the standby control on the mobile terminal is properly conducted. Namely, the priority information contained in the broadcast information is set so that the signal transmitted to the small-cell 22 shows the higher priority than that of the signal transmitted to the base cell 21.

With this scheme, it follows that the mobile terminal, upon recognizing the cell which requires the HCS standby control from the HCS control information, if existing within the small-cell 22, though the broadcast signal of the base cell 21 has the higher received level than the broadcast signal of the small-cell 22 has, stands by the small-cell 22 representing the higher priority in a way that refers to the cell priority thereof.

The call connection control unit 46 performs connection control about each user's call that is received by each antenna and signal-processed by each radio unit. Note that the present invention does not limit the function of the call connection control unit 46, and hence it may suffice that the call connection control unit 46 has a general call connection control function. Herein, an in-depth description of the call connection control unit 46 is omitted.

<Concerning Transmission Power Determining Method>

The transmission power determining method by the transmission power control unit 44 will hereinafter be described.

Reuse of the frequency allocated to each cell can be calculated based on a Signal to Interference power Ratio (SIR) that can satisfy the target communication quality. To be specific, a frequency-reuse-enabled distance and a frequency reuse count are determined from a predetermined SIR value (which will hereinafter be referred to as a required SIR value) based on the target communication quality requested of the system.

Herein, it is assumed that 10 (db) is the required SIR value. In this example, if a desired signal received level is higher by 10 (dB) than a level of the interference signal, it is determined that the target communication quality is satisfied.

Further, supposing that a propagation loss is proportional to the 3.5th power of the distance by use of a general propagation model of the mobile communication system, when a reach distance of the signal up to a predetermined point is X, and X representing the level difference of 10 (dB) can be expressed such as 35 log X=10 (dB). Namely, at the reach point of the desired signal, if the reach distance of the interference signal to this point is twice as long as the reach distance of the desired signal up to the point, the signal level of the interference signal at the point decreases by 10 (dB), thereby enabling the target communication quality to be satisfied.

This implies that the target communication quality can be satisfied by equalizing the area radius of the small-cell 22 to one-third of the distance between the base stations. With this scheme, the transmission power control unit 44 can, if Y is set as a ratio of the signal transmission power forming the base cell 21 to the signal transmission power forming the small-cell 22, determines this power ratio Y by a formula such as 10 log Y=10 (dB). Finally, the transmission power control unit 44 can determine that the signal transmission power forming the small-cell 22 is 1 (W), if the signal transmission power forming the base cell 21 is previously set adjustably to 10 (W) (see FIG. 7).

Incidentally, as illustrated in the example of FIG. 4, if the sector cells of the small-cell 22, to which the same frequency bands are allocated, are disposed in a way that does not face on each other in the neighboring base stations, the thus-determined area radius of the small-cell 22 can be set larger than one-third of the distance between the base stations. In this case, it may suffice that in the relationship between the sector cells, to which the same frequency bands are allocated, of the peripheral small-cells 22, the area radius enabling the SIR value to satisfy the predetermined target value is determined by taking account of the propagation loss, an angular loss of each of the directional antennas forming the respective sector cells, etc.

Figure 8:
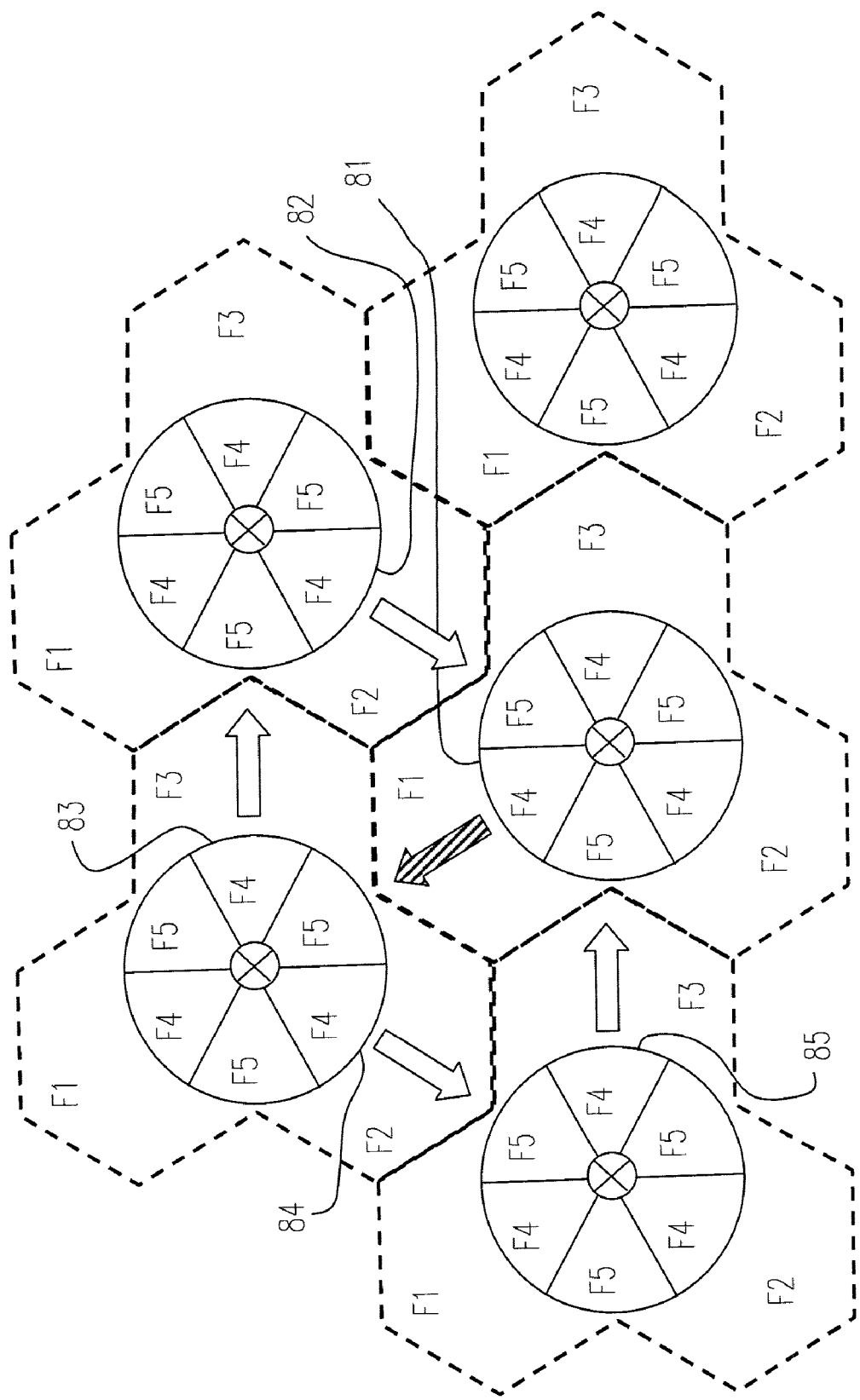
FIG. 8 is a diagram representing a method of determining an area radius of a small-cell.

FIG. 8 is a diagram representing a method of determining the area radius of the small-cell in the case where the sector cells of the small-cell 22, to which the same frequency band is allocated, are disposed in a way that does not face on each other in the neighboring base stations. In the case of emphasizing the sector cell 81, the consideration may be given to the relationship between the sector cells 82, 83, 84, 85 of the peripheral small-cells 22, to which the same frequency band as that of the sector cell 81 is allocated.

[Operation and Effect of Embodiment]

Herein, the operation and the effect of the FDMA cellular system in the embodiment discussed above will be described.

Each base station building up the FDMA cellular system in the embodiment uses the directional antennas, thereby forming the cells in which the small-cell 22 taking the 6-sector configuration, which does not abut on the cell of the neighboring base station, is put on the base cell 21 taking the 3-sector configuration of which the borders abut on the cell of the neighboring base station and in the internal peripheral area of the base station, respectively.

Then, the total frequency band allocated to each base station is divided by the minimum dividing count (the dividing count=5 in FIG. 4) so that with respect to the respective sector cells formed by the individual base stations, the frequency bands different from each other are allocated to the respective sector cells within the base cells 21, and the frequency bands, which are different from the frequency bands allocated to the sector cells within the base cell 21 but not the same between the neighboring sector cells, are allocated to the respective sector cells within the small-cell 22.

Moreover, in the relationship between the neighboring base stations, the frequency allocation is determined so that the frequency bands to be allocated are not redundant among the sector cells of the neighboring base cells 21 of which the borders abut on each other and so that the sector cells to which the same frequency band is allocated within the small-cell 22 do not face on each other.

Owing to this scheme, with respect to the sector cells of the base cells 21, in the relationship between any other sector cells within the same base cell 21 and the sector cells of other neighboring base cells 21, the same frequency band is not utilized between the sector cells of which the cell borders abut on each other, thereby enabling the interference level to be restrained at the allowable level or under and the same frequency band (subchannels) to be repeatedly utilized also in the neighboring base station.

Moreover, with respect to the sector cells of the small-cell 22, also in the relationship between the sector cells of the base cell 21 allocating thereon and any other sector cells, of which the cell borders abut on, within the same small-cell 22, the same frequency band is not used, and hence the interference level can be restrained at the allowable level or under.

Further, the small-cell 22 adopts the 6-sector configuration, and therefore the total frequency band used for the single base station can be set larger than the whole frequency bands allocated to each base station by alternately arranging the two frequency bands among the divided frequency bands.

The bandwidth of each of the divided frequency bands is determined respectively corresponding to the traffic amount etc. of the individual sector cell which is to be allocated, however, if the rate of the frequency bands allocated to the sector cells of the small-cell 22 becomes larger than the whole allocated frequency band, the frequency-utilization efficiency can be increased.

Therefore, according to the FDMA cellular system in the embodiment, the frequency reuse allocation such as this enables the interference level to be the allowable level or under even in the mobile terminal located at the cell border, and the frequency band for use in the respective base stations can be set larger than the whole allocation frequency band.

Moreover, each base station notifies the mobile terminal of the HCS control information used for the mobile terminal to perform the HCS standby control, the priority information of the sector cells, etc as the broadcast information contained in the signals transmitted to the individual sector cells.

With this scheme, the mobile terminal connected to the FDMA cellular system in the embodiment, also in the cell configuration taking the structure which overlays the small-cell 22 on the base cell 21, can utilize the proper cell corresponding to its location.

MODIFIED EXAMPLES

Figure 9:
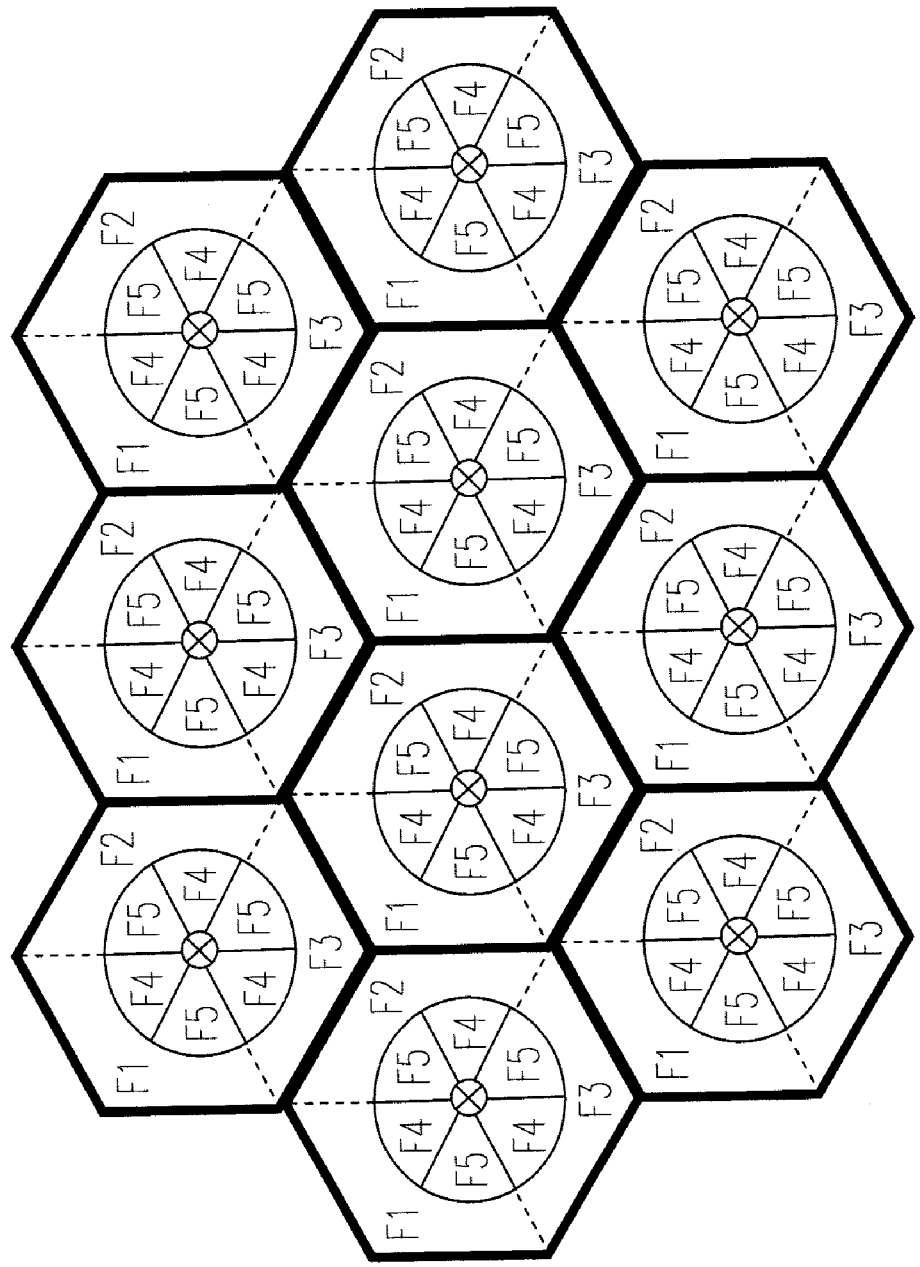
FIG. 9 is a diagram representing a first modified example of the cell configuration in the embodiment.

In the FDMA cellular system according to the embodiment discussed above, as illustrated in FIG. 2, each base cell 21 is configured by the three sector cells taking the hexagonal shape, however, another available configuration is that the base cell 21 taking the hexagonal shape on the whole, and the interior thereof is divided into three sector cells. FIG. 9 illustrates the cell configuration in this case. FIG. 9 is a diagram representing a first modified example of the cell configuration in the embodiment, and illustrates a frequency allocation of the frequencies F1 through F5.

Figure 10:
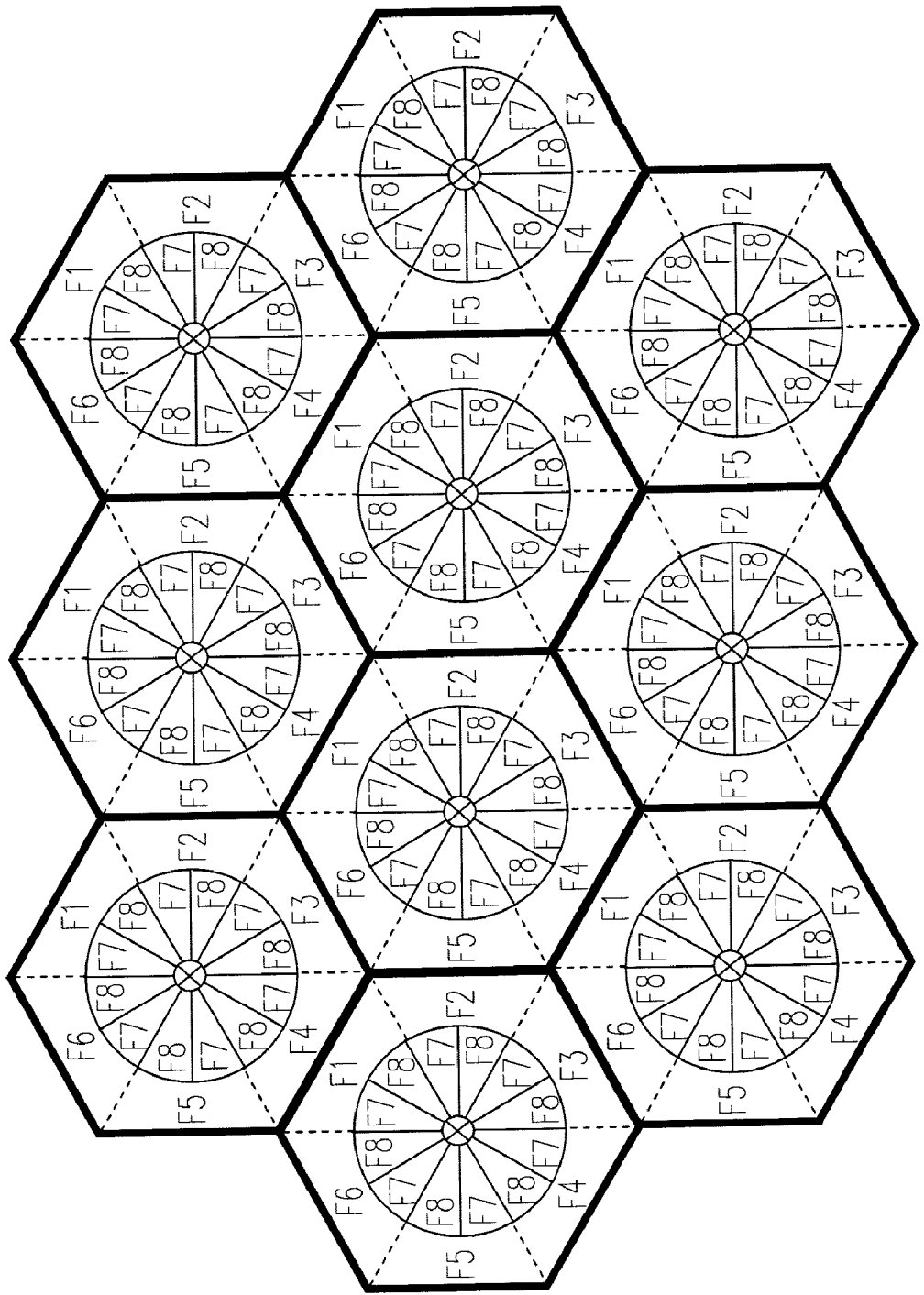
FIG. 10 is a diagram representing a second modified example of the cell configuration in the embodiment.
Figure 11:
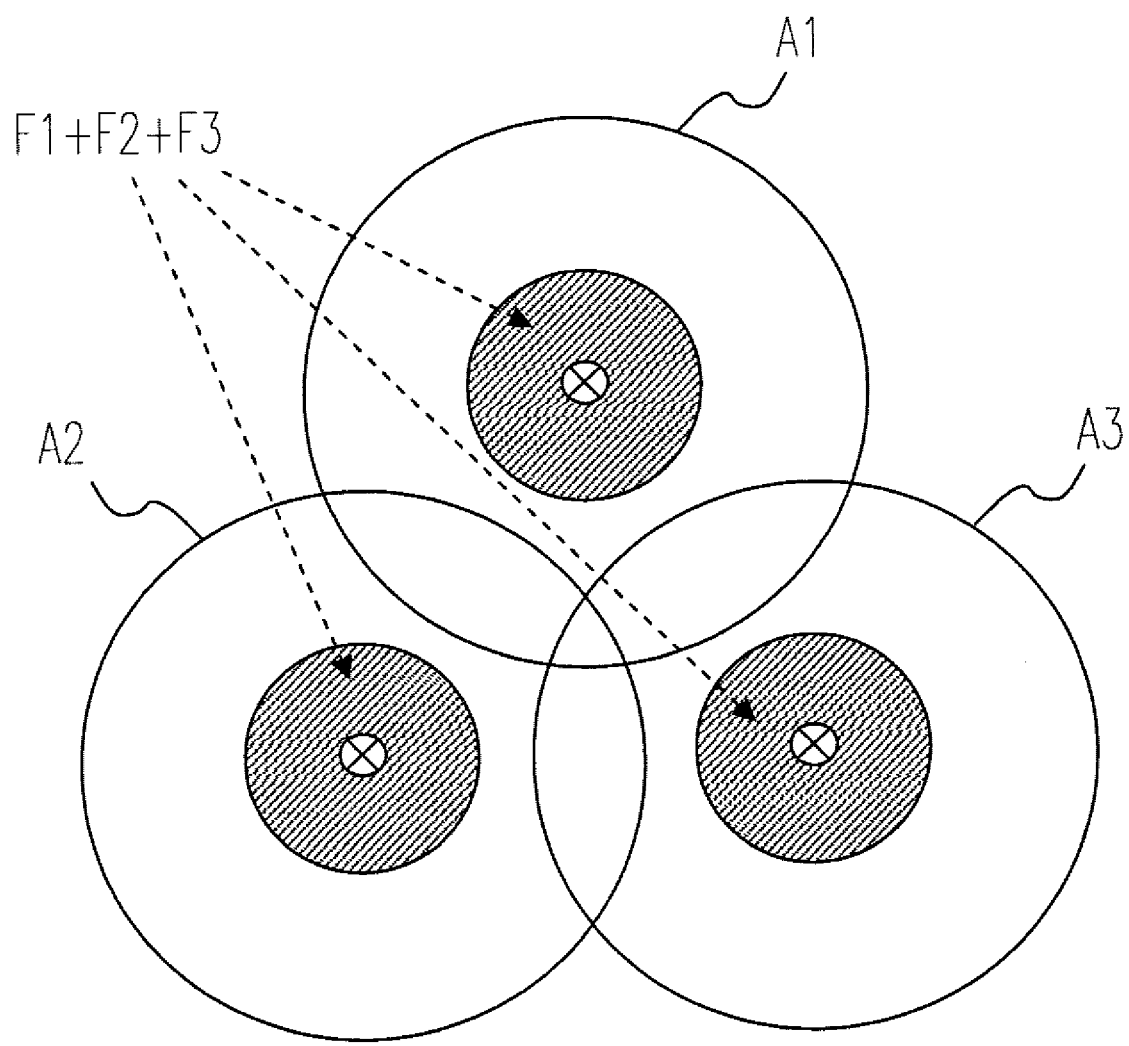
FIG. 11 is a diagram representing a frequency allocation technique based on the conventional art.
Figure 12:
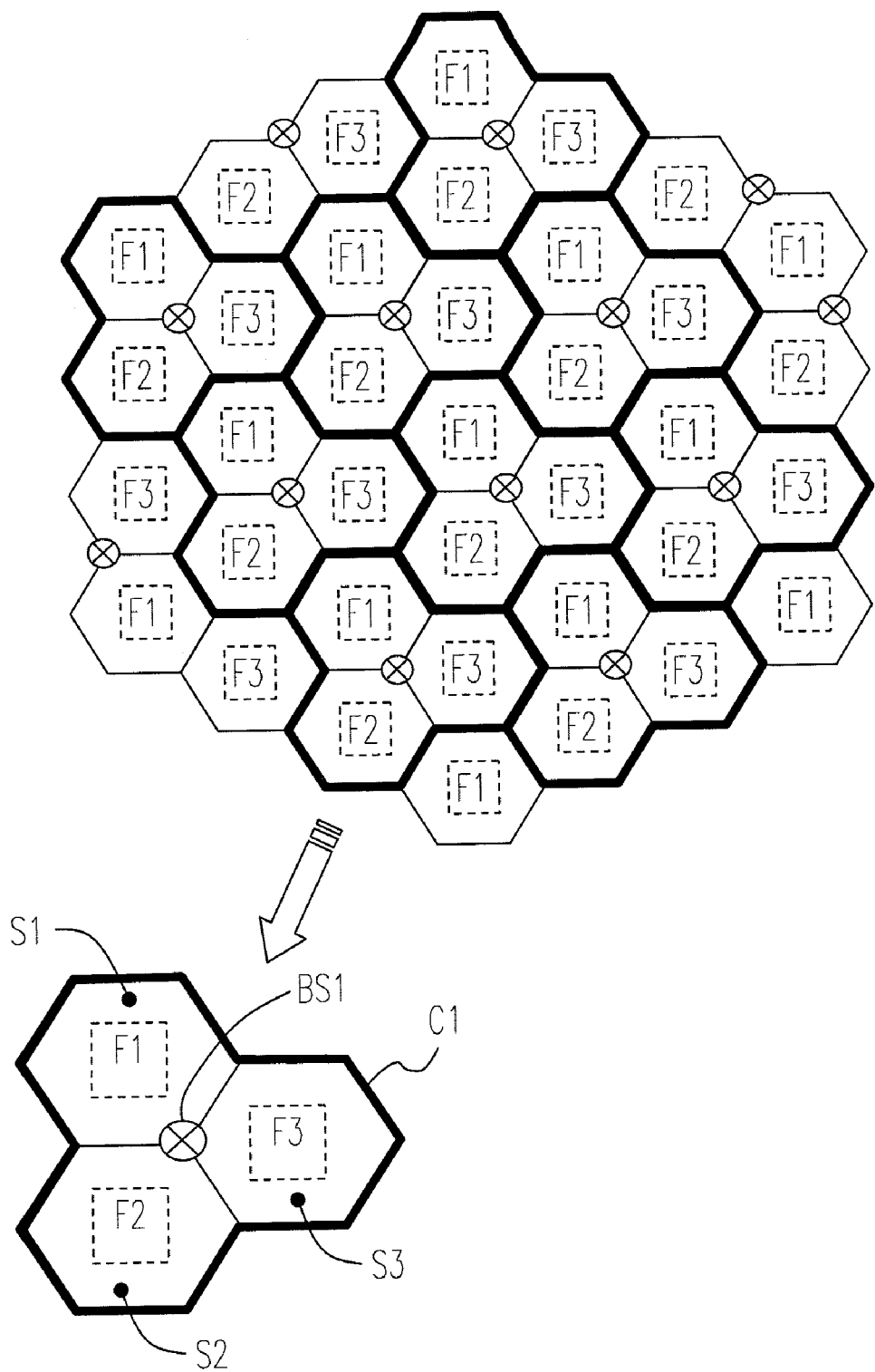
FIG. 12 is a diagram representing an example of the frequency allocation in the case of using a sector configuration based on the conventional art.

Still another cell configuration is that the base cell 21 adopts the 6-sector configuration, while the small-cell 22 takes a 12-sector configuration. FIG. 10 is a diagram representing a second modified example of the cell configuration in the embodiment, and illustrates a frequency allocation of the frequencies F1 through F8. In this case also, with respect to the sector cells formed by each base station, the frequency bands different from each other are allocated to the respective sector cells within the base cell 21, and the frequency bands, which are different from the frequency bands allocated to the sector cells within the base cell 21 but not the same between the neighboring sector cells, are allocated to the respective sector cells within the small-cell 22. Further, in the relationship between the neighboring base stations, the frequency bands to be allocated are not redundant among the sector cells of the neighboring base cells 21 of which the borders abut on each other.

Moreover, in the FDMA cellular system according to the embodiment discussed above, as illustrated in FIG. 4, the frequency allocation is determined so that the same frequency band is not allocated to the face-to-face sector cells of the small-cells 22 of the neighboring base stations, however, the same frequency band may also be allocated among those face-to-face sector cells.

In the case of the allocation such as this, as illustrated in FIGS. 2, 3 and 4, there might be a case in which the area radius of the small-cell 22 can not be set to the half of the area radius of the base cell 21, however, the transmission power control unit 44 can handle this scheme by further decreasing the area radius of the small-cell 22. Thus, if the area radius of the small-cell 22 is decreased, though the traffic accommodable within the small-cell 22 reduces, it remains unchanged that the frequency band for use in the respective base stations can be set larger than the whole allocation frequency band.

What is claimed is:

1. A base station device forming a cell, comprising:
a plurality of directional antennas;
a power control unit controlling respectively transmission power of signals transmitted from said directional antennas;
a frequency management unit managing frequency bands used in the cell, and
a notifying unit notifying each of sector cells of a base cell and a small-cell of control information in which the priority of the small-cell is set higher than the priority of the base cell,
wherein the cell is formed with layers of the base cell having a cell border with a cell formed by a neighboring base station device and including a plurality of sector cells and the small-cell having a cell radius smaller than a cell radius of the base cell and including at least four sector cells, by said plurality of directional antennas and said power control unit, and
said frequency management unit manages frequency bands so that frequency bands different from each other are allocated to the sector cells of the base cell, and a frequency band, which is different from the frequency bands allocated to the base cell and different between neighboring sector cells but the same between at least two sector cells, is allocated to each of the sector cells of the small-cell.

2. A base station device according to claim 1, wherein said frequency management unit manages the frequency bands so that the two frequency bands are alternately allocated to the sector cells of the small-cell.

3. A base station device according to claim 1, wherein said frequency management unit manages the frequency bands so that the different frequency bands are allocated to face-to-face sector cells of the small-cell in a relationship with the neighboring base station device.

4. A base station device according to claim 1, wherein said power control unit controls the transmission power of each signal so that the cell radius of the small-cell becomes a half of the cell radius of the base cell.

5. A cell forming method in a base station device forming a cell, comprising:
a cell forming step of forming the cell with layers of a base cell having a cell border with a cell formed by a neighboring base station device and including a plurality of sector cells and a small-cell having a cell radius smaller than a cell radius of the base cell and including at least four sector cells,
a frequency allocating step of allocating frequency bands different from each other to the sector cells of the base cell, and allocating a frequency band, which is different from each of the frequency bands allocated to the base cell and different between neighboring sector cells but the same between at least two sector cells, to each of the sector cells of the small-cell, and
a notifying step of notifying each of the sector cells of the base cell and the small-cell of control information in which the priority of the small-cell is set higher than the priority of the base cell.

6. A cell forming method according to claim 5, wherein said frequency allocating step includes alternately allocating the two frequency bands to the sector cells of the small-cell.

7. A cell forming method according to claim 5, wherein said frequency allocating step includes allocating the different frequency bands to face-to-face sector cells of the small-cell in a relationship with the neighboring base station device.

8. A cell forming method according to claim 5, wherein said cell forming step includes forming the cell so that a cell radius of the small-cell becomes a half of the cell radius of the base cell.

* * * * *